(12) United States Patent
Hamachi

(10) Patent No.: US 8,472,629 B2
(45) Date of Patent: Jun. 25, 2013

(54) COMMUNICATION SYSTEM, COMMUNICATION DEVICE AND PROCESSING METHOD THEREFOR

(75) Inventor: Toshifumi Hamachi, Toyko (JP)

(73) Assignee: Canon Kabushiki Kaisha, Tokyo (JP)

( * ) Notice: Subject to any disclaimer, the term of this patent is extended or adjusted under 35 U.S.C. 154(b) by 1110 days.

(21) Appl. No.: 12/162,835

(22) PCT Filed: Mar. 7, 2007

(86) PCT No.: PCT/JP2007/055015
§ 371 (c)(1),
(2), (4) Date: Jul. 31, 2008

(87) PCT Pub. No.: WO2007/108372
PCT Pub. Date: Sep. 27, 2007

(65) Prior Publication Data
US 2009/0028341 A1 Jan. 29, 2009

(30) Foreign Application Priority Data
Mar. 20, 2006 (JP) ................................. 2006-077400

(51) Int. Cl.
*G06F 15/16* (2006.01)
*H04L 9/08* (2006.01)
*H04L 9/06* (2006.01)
*H04L 9/00* (2006.01)

(52) U.S. Cl.
USPC ............. 380/278; 380/44; 380/281; 380/282; 709/208; 709/225; 709/226; 709/228; 713/1; 713/100; 713/150; 713/171

(58) Field of Classification Search
USPC ........................................................ 380/278
See application file for complete search history.

(56) References Cited

U.S. PATENT DOCUMENTS

| 6,169,802 B1 * | 1/2001 | Lerner et al. .................... 380/44 |
| 7,107,462 B2 * | 9/2006 | Fransdonk .................... 713/193 |
| 7,127,613 B2 * | 10/2006 | Pabla et al. .................... 713/171 |
| 7,228,427 B2 * | 6/2007 | Fransdonk .................... 713/176 |

(Continued)

FOREIGN PATENT DOCUMENTS

| JP | 9-319673 | 12/1997 |
| JP | 2002-359623 | 12/2002 |
| WO | 2004/084035 A | 9/2004 |

OTHER PUBLICATIONS

Farid, T., et al, "Secure Routing with AODV Protocol for Mobile Ad Hoc Networks", 2006, Dept. of CS, Univ. of Windsor, entire document, http://web2.uwindsor.ca/courses/cs/aggarwal/cs60564/surveys/AnithaTahira.pdf.*

(Continued)

Primary Examiner — Christopher J Brown
Assistant Examiner — Ronald Baum
(74) Attorney, Agent, or Firm — Fitzpatrick, Cella, Harper & Scinto

(57) ABSTRACT

A master generates a session key, receives public keys from a plurality of slaves, encrypts the session key using the individual public keys, transmits the encrypted session key to the plurality of slaves, encrypts data using the encrypted session key, and sends it to the plurality of slaves. A plurality of slaves transmit public keys to a master device, receive and decrypt a session key encrypted using individual public keys, receive data encrypted using the session key from the master, and decrypt it using the decrypted session key.

17 Claims, 13 Drawing Sheets

U.S. PATENT DOCUMENTS

| | | | |
|---|---|---|---|
| 7,302,256 B1* | 11/2007 | O'Hara et al. | 455/418 |
| 7,346,370 B2* | 3/2008 | Spaur et al. | 455/556.1 |
| 7,380,125 B2* | 5/2008 | Di Luoffo et al. | 713/172 |
| 7,643,817 B2* | 1/2010 | Klug et al. | 455/411 |
| 7,979,913 B2* | 7/2011 | Jang et al. | 726/29 |
| 2002/0032853 A1* | 3/2002 | Preston et al. | 713/151 |
| 2002/0147819 A1 | 10/2002 | Miyakoshi et al. | 709/228 |
| 2002/0147820 A1* | 10/2002 | Yokote | 709/229 |
| 2003/0046539 A1* | 3/2003 | Negawa | 713/163 |
| 2003/0088765 A1* | 5/2003 | Eschbach et al. | 713/150 |
| 2003/0163692 A1* | 8/2003 | Kleinsteiber et al. | 713/169 |
| 2003/0177358 A1* | 9/2003 | Martin et al. | 713/171 |
| 2004/0111607 A1* | 6/2004 | Yellepeddy | 713/155 |
| 2004/0218762 A1* | 11/2004 | Le Saint et al. | 380/277 |
| 2005/0114367 A1* | 5/2005 | Serebrennikov | 707/100 |
| 2005/0198490 A1* | 9/2005 | Jaganathan et al. | 713/151 |
| 2005/0244007 A1* | 11/2005 | Little et al. | 380/270 |

OTHER PUBLICATIONS

Shin Hitotsumatsu, Supervising Editor, "Researching Data Protection and Encryption", Japan, Nikkei Inc., pp. 59-65, 153-165 (Jul. 29, 1983).

Japanese Office Action, dated Aug. 19, 2011, issued by the Japanese Patent Office, in Japanese Patent Application No. 2006-077400.

Eiji Okamoto, "Angou Riron Nyumon", The $1^{st}$ edition, Feb. 25, 1993, pp. 109-112.

* cited by examiner

COMMUNICATION SYSTEM, COMMUNICATION DEVICE AND PROCESSING METHOD THEREFOR

TECHNICAL FIELD

The present invention relates to a communication system including a master device and a plurality of slave devices, to a communication device, and to a processing method therefor.

BACKGROUND ART

When using wireless LANs conforming to the IEEE 802.11 standard, users have to set wireless communication parameters, such as network identifiers (ESSID), encryption methods, cryptographic keys(encryption keys), authentication methods, authentication keys, etc. Because of the complexity of these setting operations, methods have been proposed for automatically performing them between terminals. For instance, a method for automatic transfer of wireless parameter settings between an access point (relay station) and a station (terminal) from the access point to the station by means of a simple operation, etc. has been implemented as an actual product.

Moreover, in recent years, communication is also more frequently conducted over so-called ad hoc networks, in which terminals communicate with one another directly over a wireless LAN without passing through an access point. The demand for communication between a plurality of terminals on such ad hoc networks is on the increase and methods for automatic setting of parameters on a plurality of terminals are required (see Patent document 1: U.S. Pre-Grant Publication No. 2002/147,819 (Japanese Patent Laid-Open No. 2002-359623)).

In conventional automatic parameter setting methods, a master device such as an access point, which operates as a master, has a set made up of a public key and a private key, and slave devices, which function as slaves, generate session keys. The setting of wireless parameters is initiated when the master device transmits a public key to the slave devices. Here, when the slave devices receive the public key, they encrypt session keys using the public key and transmit them to the master device.

On the other hand, when the master device receives a session key encrypted using the public key, it uses the private key for decryption. When the decryption is over, wireless parameters are encrypted using the session key and transmitted to the slave device. By doing so, when the slave device receives the wireless parameters encrypted using the session key, it uses the session key for decryption. When the decryption is over, the slave device acquires and sets wireless parameters. Therefore, processing (heavy-load processing) involving decrypting data encrypted with a public key using a private key corresponding to the public key has been performed by the master device.

However, when wireless communication parameters are set in a plurality of devices, no other processing can be performed simultaneously when the master device performs such processing, and therefore, master device functionality ends up being occupied by a single slave device. Therefore, other slave devices must wait until the processing by the master device is complete, and the time it takes for all the slave devices to complete wireless parameter setting is prolonged depending on the number of times the master device decrypts the session keys.

DISCLOSURE OF INVENTION

It is an object of the present invention to carry out communication parameter exchange between a plurality of devices at high speed.

According to one mode of the present invention, in order to accomplish the above-mentioned object, there is provided a communication system including a master device and a plurality of slave devices, wherein the master device comprises: a generation unit that generates a session key; a unit that receives public keys from the slave devices, encrypts the session key using the public keys and transmits the encrypted session key to the slave devices; and a data transmission unit that encrypts data using the session key and transmits the encrypted data to the slave devices; and each slave device comprises: a decryption unit that transmits the public key to the master device, receives the session key encrypted using the public key and decrypts it; and a data decryption unit that receives data encrypted using the session key from the master device and decrypts it using the decrypted session key.

Moreover, according to one mode of the present invention, there is provided a communication device supplying common data to a plurality of devices, comprising: a generation unit that generates a session key; a reception unit that receives public keys from the devices; a first encryption unit that encrypts the session key using the public keys corresponding to the devices, received by the reception unit; a first transmission unit that transmits to the devices the session key encrypted using the first encryption unit; a second encryption unit that encrypts the common data using the session key; and a second transmission unit that transmits to the devices the common data encrypted using the second encryption unit.

Moreover, according to one mode of the present invention, there is provided a processing method for a communication system including a master device and a plurality of slave devices, comprising: a generation step, wherein the master device generates a session key; a public key transmission step, wherein each slave device, which has a set made up of a public key and a private key, transmits the public key to the master device; a public key reception step, wherein the master device receives the public keys from the slave devices; a session key transmission step, wherein the master device encrypts the session key using the public keys of the slave devices and transmits the encrypted session key to the slave devices; a session key reception step, wherein the slave devices receive the encrypted session key from the master device; a session key decryption step, wherein the slave devices decrypt the encrypted session key using the private keys; a data transmission step, wherein the master device encrypts data using the session key and transmits it to the slave devices; a data reception step, wherein the slave devices receive the encrypted data from the master device; and a data decryption step, wherein the slave devices decrypt the encrypted data using the decrypted session keys.

Moreover, according to one mode of the present invention, there is provided a processing method for a communication device supplying common data to a plurality of devices, comprising: a generation step of generating a session key; a reception step of receiving public keys from the devices; a first encryption step of encrypting the session key using the public keys corresponding to the devices, received in the reception step; a first transmission step of transmitting to the devices the session key encrypted in the first encryption step; a second encryption step of encrypting the common data using the session key; and a second transmission step of transmitting to the devices the common data encrypted in the second encryption step.

Further features of the present invention will become apparent from the following description of exemplary embodiments with reference to the attached drawings.

BEST MODE FOR CARRYING OUT THE INVENTION

Figure 1:
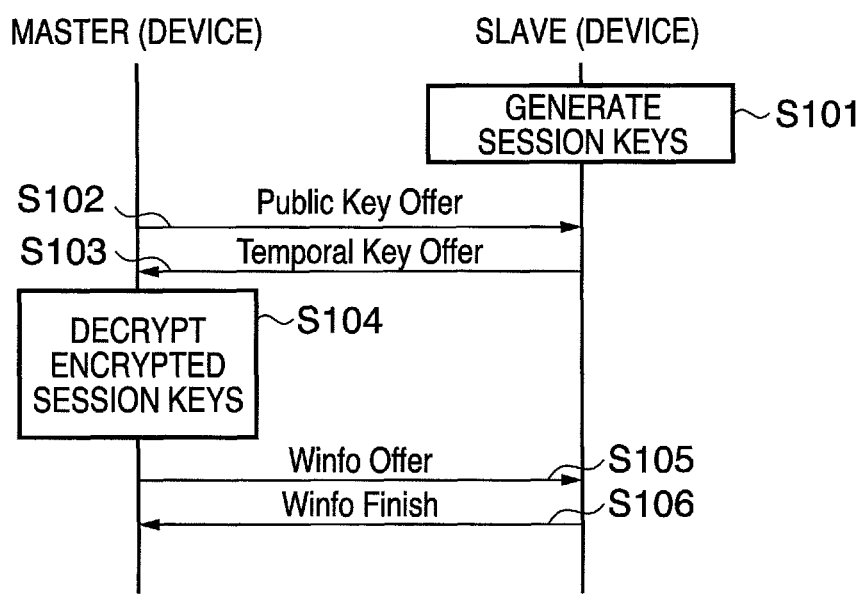
FIG. 1 is a diagram illustrating an automatic wireless communication parameter setting sequence in the one-to-one communication mode.

The best mode for carrying out the invention is explained in detail below by referring to the drawings.

[One-To-One Communication Mode]

First of all, the method of automatic wireless communication parameter setting will be explained with reference to FIG. 1 for a case, wherein two digital cameras equipped with wireless communication functionality and having a one-to-one communication mode and a multiple device communication mode carry out one-to-one communication. It should be noted that wireless communication parameters are parameters required for wireless communication, and are all of or at least one of network identifiers (ESSID), encryption methods, cryptographic keys (encryption keys), authentication methods, authentication keys, and so on.

The wireless devices are pre-set to have the same wireless communication parameters and the network used for communication parameter setting is constructed using these wireless communication parameters. In addition, a master/slave role is assigned to each of the wireless devices, with the master collecting information on the number of slaves, as well as the MAC addresses and automatic parameter setting versions of the slaves.

FIG. 1 is a diagram illustrating an automatic wireless communication parameter setting sequence in the one-to-one communication mode. First of all, a device operating as a slave generates a session key (S101). Here, a device operating as a master encloses its own public key in a "Public Key Offer" and transmits it to the slave by unicast (S102). The slave receiving this "Public Key Offer" retrieves the master's public key and encrypts the session key using the public key. The slave then encloses the encrypted session key in a "Temporal Key Offer" and transmits it by unicast to the master (S103).

On the other hand, the master receiving the "Temporal Key Offer" retrieves the session key encrypted using its public key and decrypts it using its private key (S104). Because the process of decryption takes time, the slave has to wait for a while. Subsequently, when the decryption is complete, the master encrypts wireless communication parameters using the session key, encloses them in a "Winfo Offer" and transmits it to the slave (S105). On the other hand, when the slave receives the "Winfo Offer", it retrieves the wireless communication parameters encrypted using the session key and acquires the wireless communication parameters by decrypting them using the session key. A "Winfo Finish" is then transmitted by unicast to the master (S106). After this the master sets the wireless communication parameters sent to the slave to form a network for data communication. Moreover, the slave also sets the wireless communication parameters received from the master and connects to the network for data communication.

[Multiple Device Communication Mode]

Next, the method of automatic wireless communication parameter setting will be explained with reference to FIG. 2 for a case with three wireless devices having a one-to-one communication mode and a multiple device communication mode, in which the above-described method used in the one-to-one communication mode is applied to the multiple device communication mode. It should be noted that the master and slave roles are the same as in the above-described case, in which the one-to-one communication mode was used.

Figure 2:
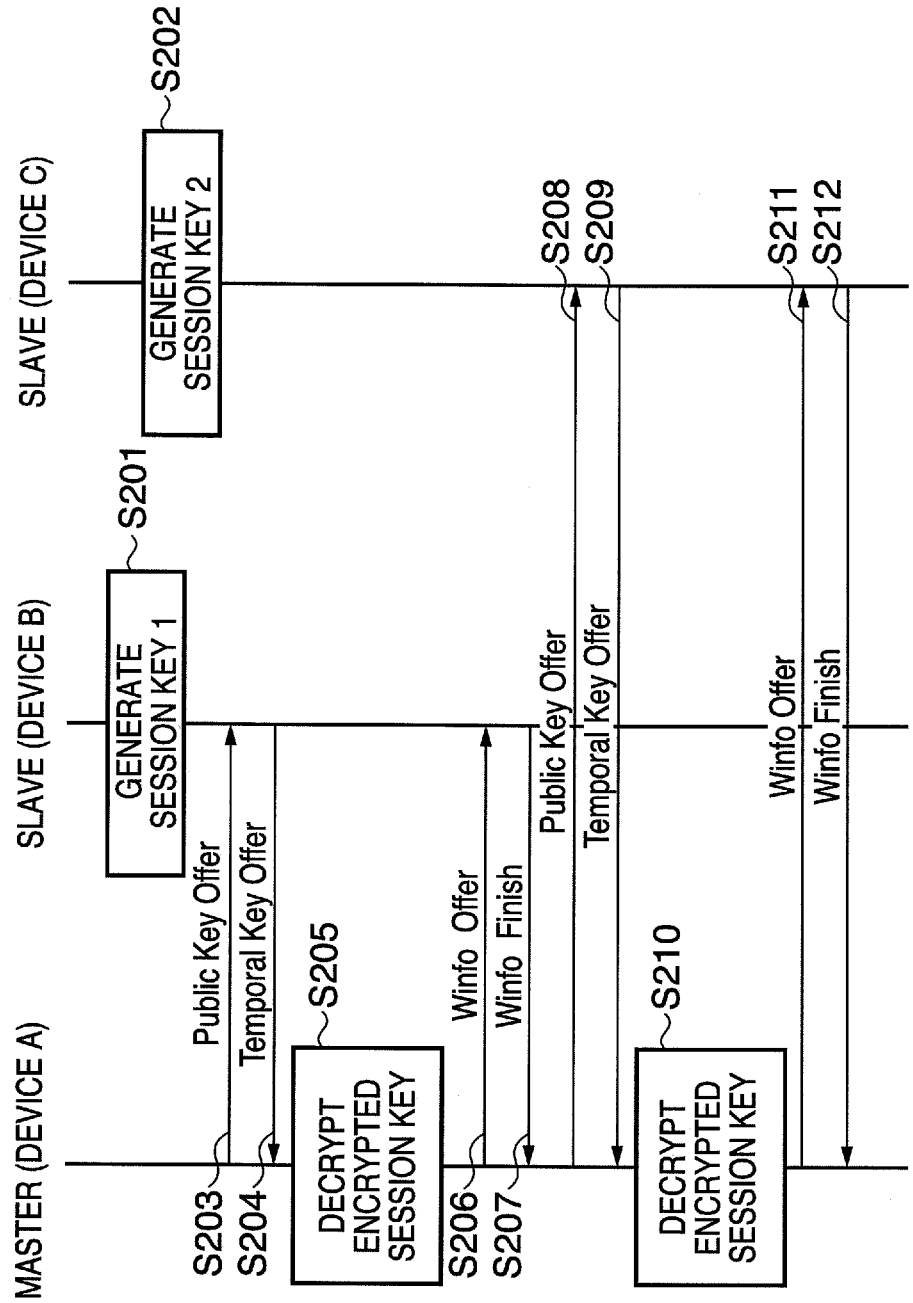
FIG. 2 is a diagram illustrating an automatic wireless communication parameter setting sequence in the multiple device communication mode.

FIG. 2 is a diagram illustrating an automatic wireless communication parameter setting sequence in the multiple device communication mode. First of all, a slave (device B) generates a session key 1 (S201) and another slave (device C) generates a session key 2 (S202). Here, the master (device A) encloses its public key in a "Public Key Offer" and transmits it to a slave (device B) by unicast (S203). The slave (device B) that receives the "Public Key Offer" retrieves the public key of the master (device A) and encrypts the session key using the public key. The slave (device B) then encloses the encrypted session key in a "Temporal Key Offer" and transmits it by unicast to the master (device A) (S204).

On the other hand, the master (device A) receiving the "Temporal Key Offer" retrieves the session key 1 encrypted using its public key and decrypts it using its private key (S205). Because the process of decryption takes time, the slave (device B) has to wait for a while. Subsequently, when the decryption is complete, the master (device A) encrypts wireless communication parameters using the session key 1, encloses them in a "Winfo Offer" and transmits them to the slave (device B) (S206). On the other hand, when the slave (device B) receives the "Winfo Offer", it retrieves the wireless communication parameters encrypted using the session key 1 and acquires the wireless communication parameters by decrypting them using the session key 1. A "Winfo Finish" is then transmitted by unicast to the master (device A) (S207).

Here, when the setting of wireless communication parameters for the slave (device B) is complete, the master (device A) initiates wireless communication parameter with the other slave (device C). The session between the master (device A)

and slave (device C) is identical to the session with the other slave (device B), and its explanation is omitted. It should be noted that S203~S207 correspond to S208 to S212.

In this manner, when the one-to-one communication mode is applied to the multiple device communication mode, the master is occupied by the decryption processing of session keys encrypted using the public keys and the processing of wireless parameter setting has to be carried out consecutively, on a device-by-device basis. For this reason, the time it takes to process wireless communication parameter setting for all the slaves increases in proportion to the number of slave devices.

Thus, in this configuration, the master generates a session key and the slaves transmit the slaves' public keys to the master so as to enable the slaves to carry out the decryption processing of the session key encrypted using the public keys.

[Embodiment 1]

Next, FIG. 3 to FIG. 6 will be used to explain the system configuration and processing used when the master generates session keys and a plurality of slaves transmit the public keys of the slaves to the master in order to carry out wireless communication parameter setting. In Embodiment 1, explanations are provided regarding a case, in which wireless communication parameter setting is carried out using respective different session keys for a plurality of slaves.

Figure 3:
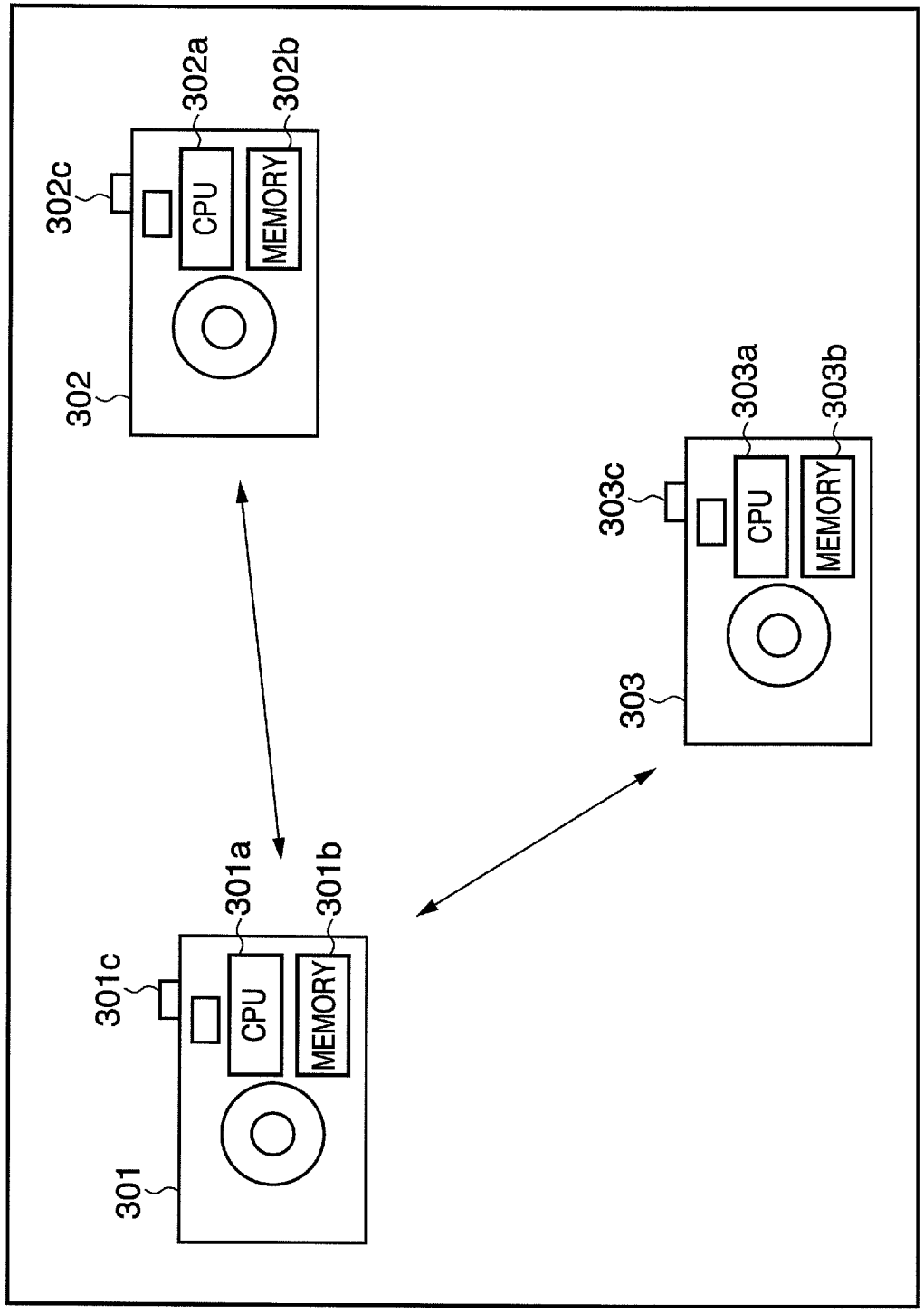
FIG. 3 is a diagram illustrating an exemplary system configuration used in Embodiment 1.

FIG. 3 is a diagram illustrating an exemplary system configuration used in Embodiment 1. In FIG. 3, numeric 301 is a device A (digital camera), which operates as a master, possesses wireless communication functionality, and has the ability to supply parameters. The device A is comprised of a control unit (CPU) 301a, a memory 301b, and a wireless unit 301c. The control unit 301a executes a program stored in the memory 301b to perform various operation described later. The memory 301b stores the program executed by the control unit 301a. The wireless unit 301c performs the wireless communication according to the control of the control unit 301a. Numeric 302 is a device B (digital camera), which operates as a slave, possesses wireless communication functionality, and has the ability to accept parameters. The device B is comprised of a control unit (CPU) 302a, a memory 302b, and a wireless unit 302c. The control unit 302a executes a program stored in the memory 302b to perform various operation described later. The memory 301b stores the program executed by the control unit 302a. The wireless unit 302c performs the wireless communication according to the control of the control unit 302a. Numeric 303 is a device C (digital camera), which operates as a slave and has the same functionality as device B. The device C is comprised of a control unit (CPU) 303a, a memory 303b, and a wireless unit 303c. The control unit 303a executes a program stored in the memory 303b to perform various operation described later. The memory 303b stores the program executed by the control unit 303a. The wireless unit 303c performs the wireless communication according to the control of the control unit 303a. Let us consider an example, in which the master 301 and slaves 302, 303 construct a network for communication parameter setting and wireless parameters used to construct the network for data communication between the above-mentioned three devices are communicated from the master 301 to the slaves 302, 303. Here, the master and slave roles are as described above, and their explanation is omitted.

Figure 4:
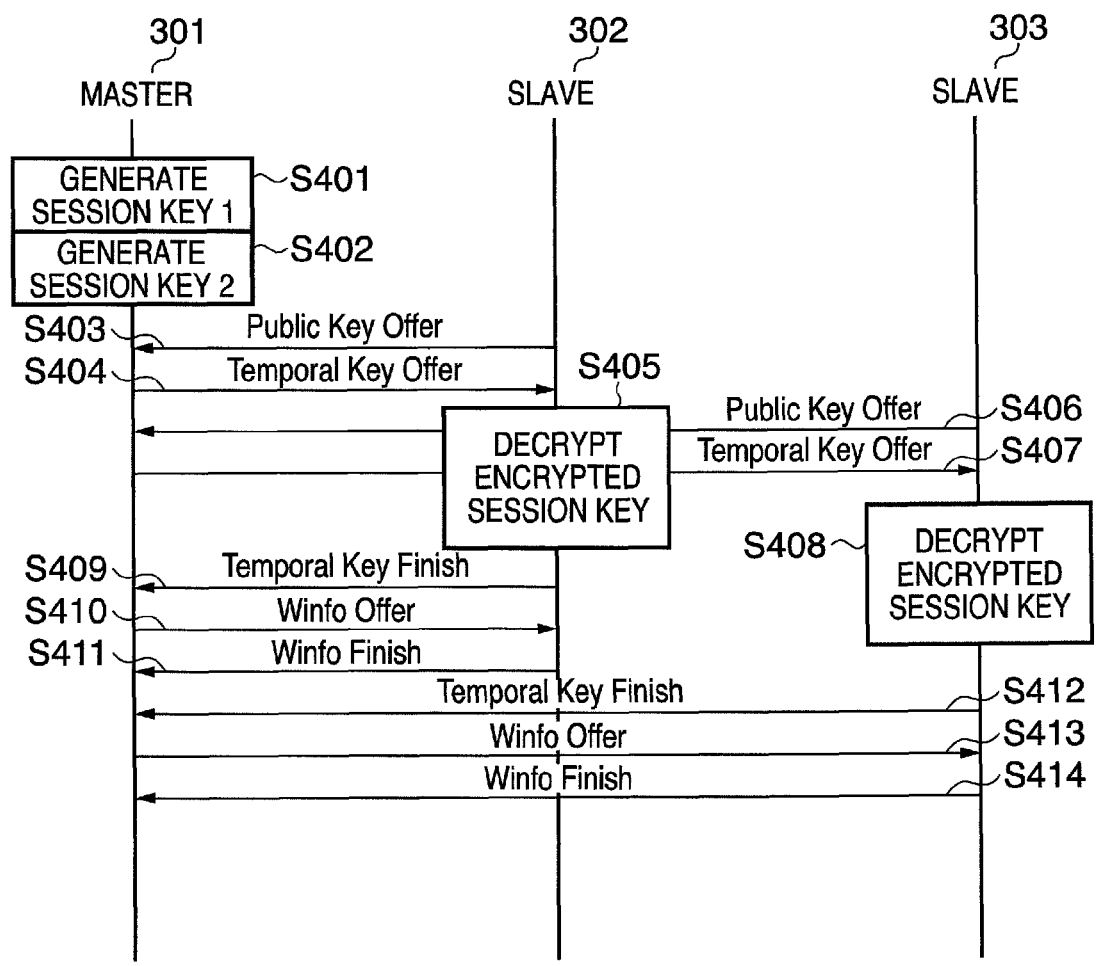
FIG. 4 is a diagram illustrating an automatic wireless communication parameter setting sequence used in the multiple device communication mode in Embodiment 1.
Figure 5:
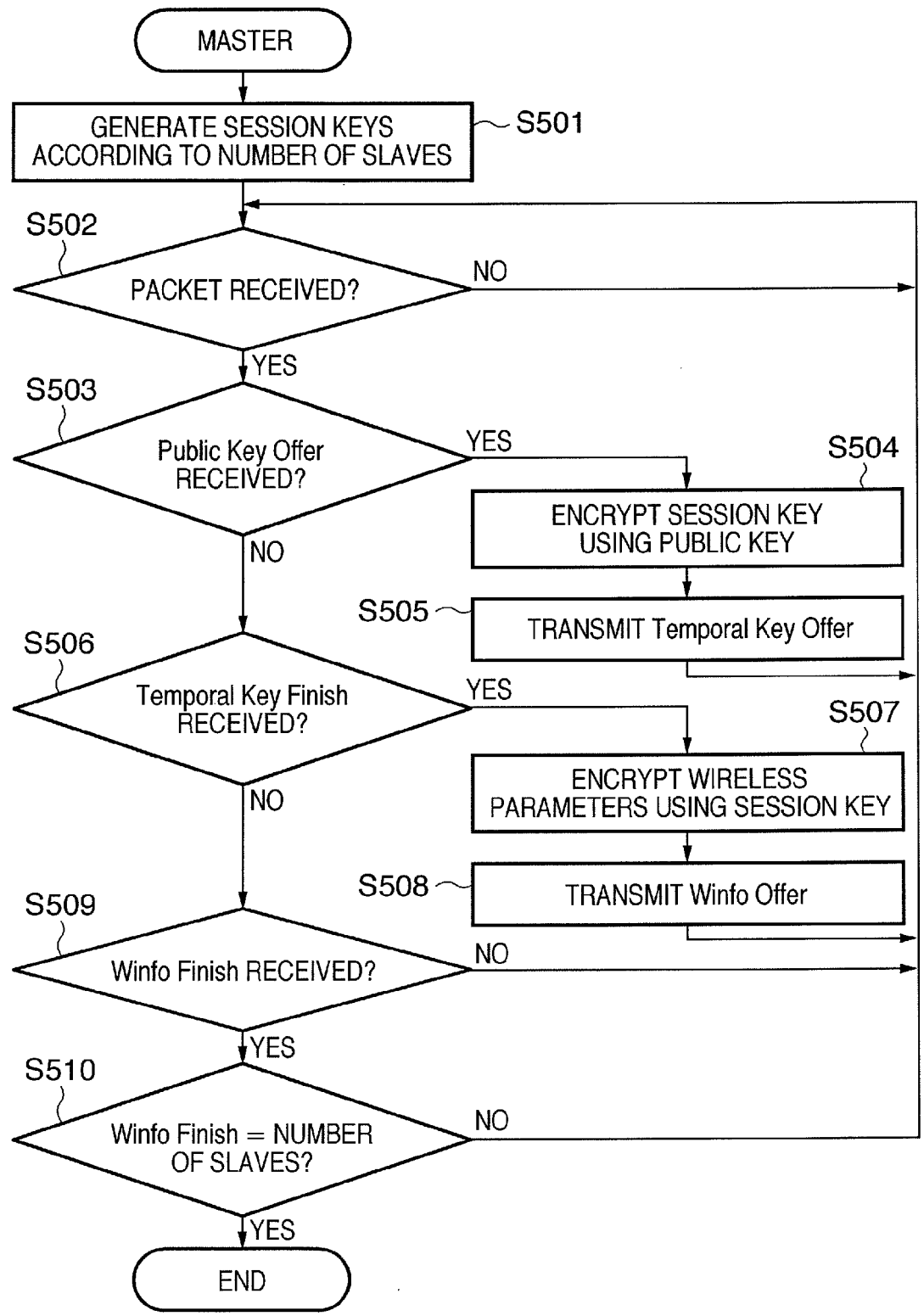
FIG. 5 is a flow chart illustrating master processing in Embodiment 1.
Figure 6:
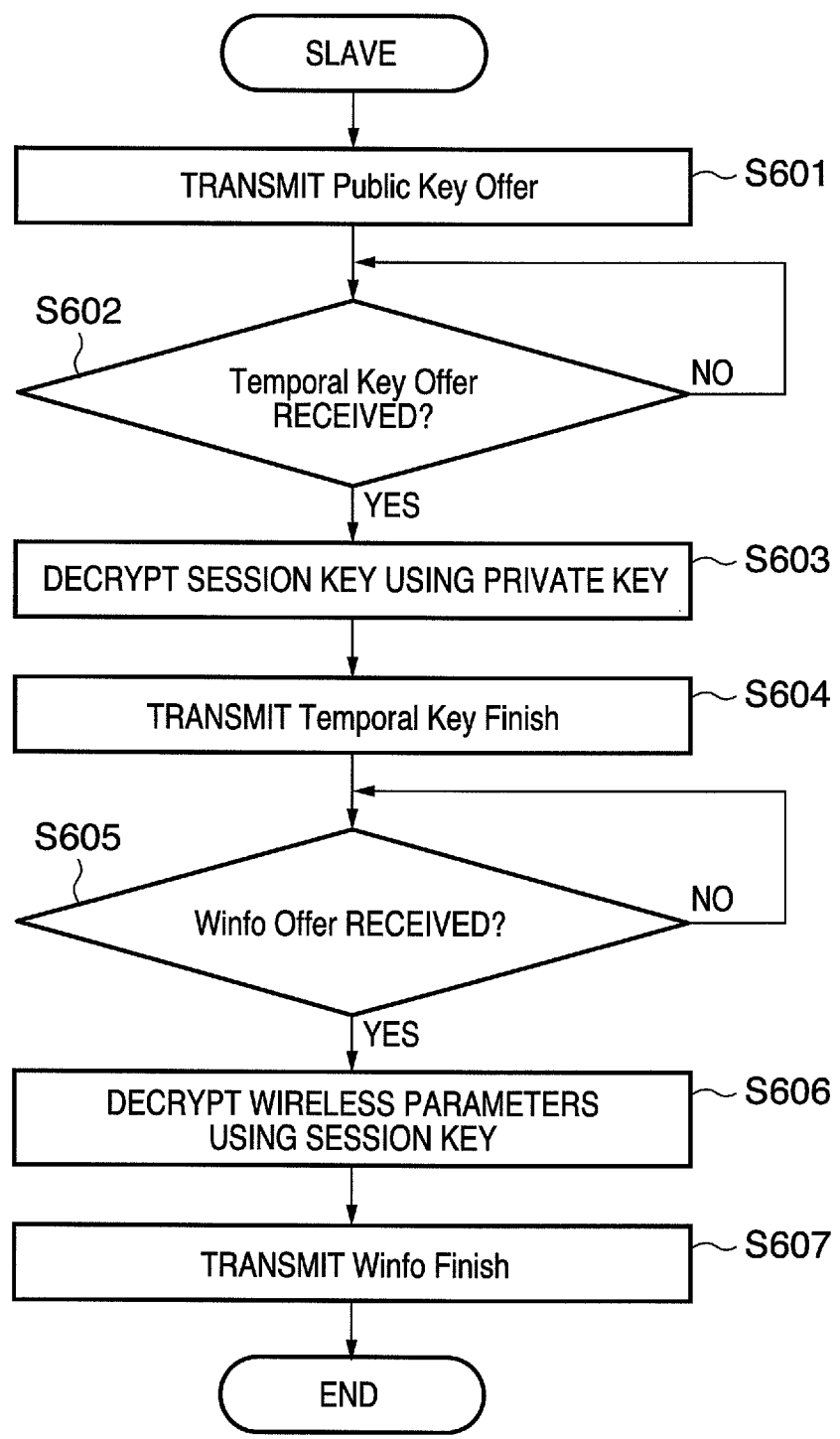
FIG. 6 is a flow chart illustrating slave processing in Embodiment 1.

FIG. 4 is a diagram illustrating an automatic wireless communication parameter setting sequence used in Embodiment 1. FIG. 5 is a flow chart illustrating master processing in Embodiment 1. FIG. 6 is a flow chart illustrating slave processing in Embodiment 1.

First of all, the master 301 generates session keys according to the number of slaves in the newly created network (S501). Specifically, it generates a session key 1 as a common key shared with slave 302 (S401) and a session key 2 as a common key shared with slave 303 (S402). Upon generation of the session keys according to the number of devices, operation is halted until an arbitrary packet is received (S502).

Here, the slave 302 encloses its public key in a "Public Key Offer" packet (S403) and transmits it to the master 301 by unicast (S601). Operation is then halted (S602) until a "Temporal Key Offer" (S404) is received from the master 301.

On the other hand, when the master 301 receives a packet ("YES" in S502), it determines whether the packet is a "Public Key Offer" (S503). Here, in case of a "Public Key Offer" from the slave 302 ("YES" in S503), a public key is retrieved from the packet and the session key 1 is encrypted using the public key (S504). Here, the master 301 encloses the encrypted session key 1 in a "Temporal Key Offer" (S404) and transmits it to the slave 302 by unicast (S505). Operation is then halted until an arbitrary packet is received (S502).

Moreover, when the slave 302, whose operation is halted, receives a "Temporal Key Offer" from the master 301 ("YES" in S602), it retrieves the session key 1 encrypted using its public key and decrypts it using its private key (S603). Then, when the decryption is complete, it transmits a "Temporal Key Finish" (S409) to the master 301 by unicast (S604).

The decryption processing by the slave 302, however, requires several seconds, during which time the slave 303 encloses its public key in a "Public Key Offer" (S406) and transmits it to the master 301 by unicast.

On the other hand, when the master 301 receives the "Public Key Offer" (S406), it retrieves the public key and encrypts the session key 2 using the public key (S504). The encrypted session key 2 is then enclosed in a "Temporal Key Offer" (S407) and transmitted to the slave 303 by unicast (S505). As a result, the slave 303 retrieves the session key 2 encrypted using its public key and decrypts it using its private key (S408, S603). Then, when the decryption is complete, it transmits a "Temporal Key Finish" (S412) to the master 301 by unicast (S604).

In addition, when the master 301 receives the "Temporal Key Finish" from the slave 302 ("YES" in S506), it encrypts wireless communication parameters using the session key 1 (S507). When the encryption is complete, the encrypted wireless communication parameters are enclosed in a "Winfo Offer" (S410) and transmitted to the slave 302 by unicast (S508).

As a result, when the slave 302 receives the "Winfo Offer" ("YES" in S605), it retrieves the wireless communication parameters encrypted using the session key 1 and performs decryption using the session key 1 (S606). Then, the slave 302 transmits a "Winfo Finish" (S411) to the master 301 by unicast (S407). On the other hand, when the master 301 receives the "Winfo Finish" from the slave 302 ("YES" in S509), it determines whether it has been received from all the slaves or not. Here, processing goes back to waiting for a packet because it has not been received from all the slaves.

In addition, when the master 301 receives the "Temporal Key Finish" from the slave 303 ("YES" in S506), it encrypts wireless communication parameters using the session key 2 (S507). When the encryption is complete, the encrypted wireless communication parameters are enclosed in a "Winfo Offer" (S413) and transmitted to the slave 303 by unicast (S508).

As a result, when the slave 303 receives the "Winfo Offer" ("YES" in S605), it retrieves the wireless communication parameters encrypted using the session key 2 and performs decryption using the session key 2 (S606). The slave 303 then transmits a "Winfo Finish" (S414) to the master 301 by unicast (S407). On the other hand, when the master 301 receives the "Winfo Finish" from the slave 303 ("YES" in S509), it determines whether it has been received from all the slaves or not. As a result, processing terminates because it has been received from all the slaves. After receiving a "Winfo Finish" from all the slaves, the master 301 sets the wireless communication parameters sent to the slaves and forms a network for data communication. Moreover, the slaves also set the wireless communication parameters received from the master and connect to the network for data communication.

Although the explanations above were provided using an example of a system composed of a master 301 and two slaves 302 and 303, the present invention is not limited thereto and can be applied to cases with a larger number of slaves.

Moreover, because the immediately preceding process terminates sequentially, the timing at which the "Public Key Offer" is transmitted by the slave can be based on a method, in which it is transmitted upon lapse of a fixed time period after the termination of the immediately preceding process and a method, in which it is sent after waiting for a randomly determined period within an appropriate range.

[Embodiment 2]

Next, a second embodiment of the present invention will be explained in detail by referring to drawings. In Embodiment 1, explanations were provided regarding a case, in which wireless communication parameter setting is carried out using respective different session keys for a plurality of slaves, and in Embodiment 2 regarding a case, in which it is carried out using the same session key.

It should be noted that the system configuration used for setting wireless communication parameters is the same as in Embodiment 1 illustrated in FIG. 3 and the master/slave roles are also the same.

Figure 7:
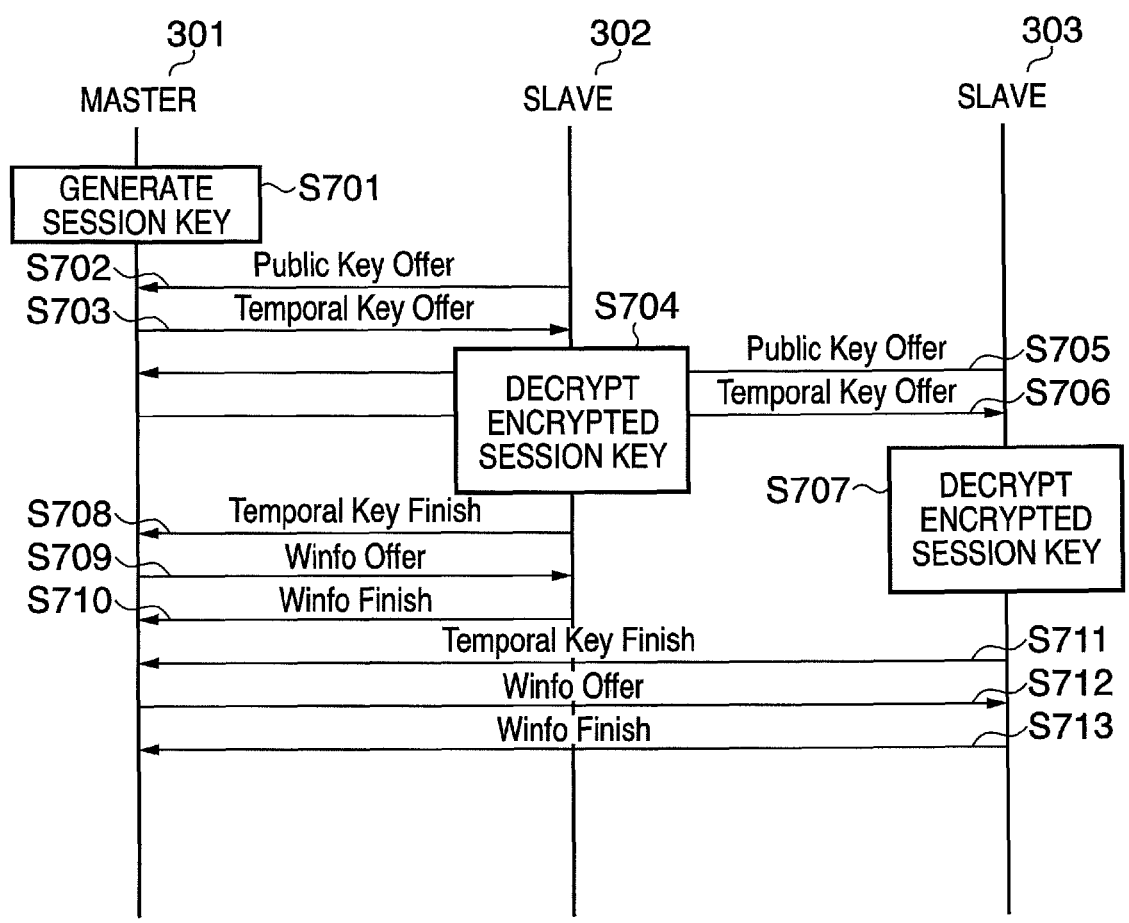
FIG. 7 is a diagram illustrating an automatic wireless communication parameter setting sequence used in the multiple device communication mode in Embodiment 2.
Figure 8:
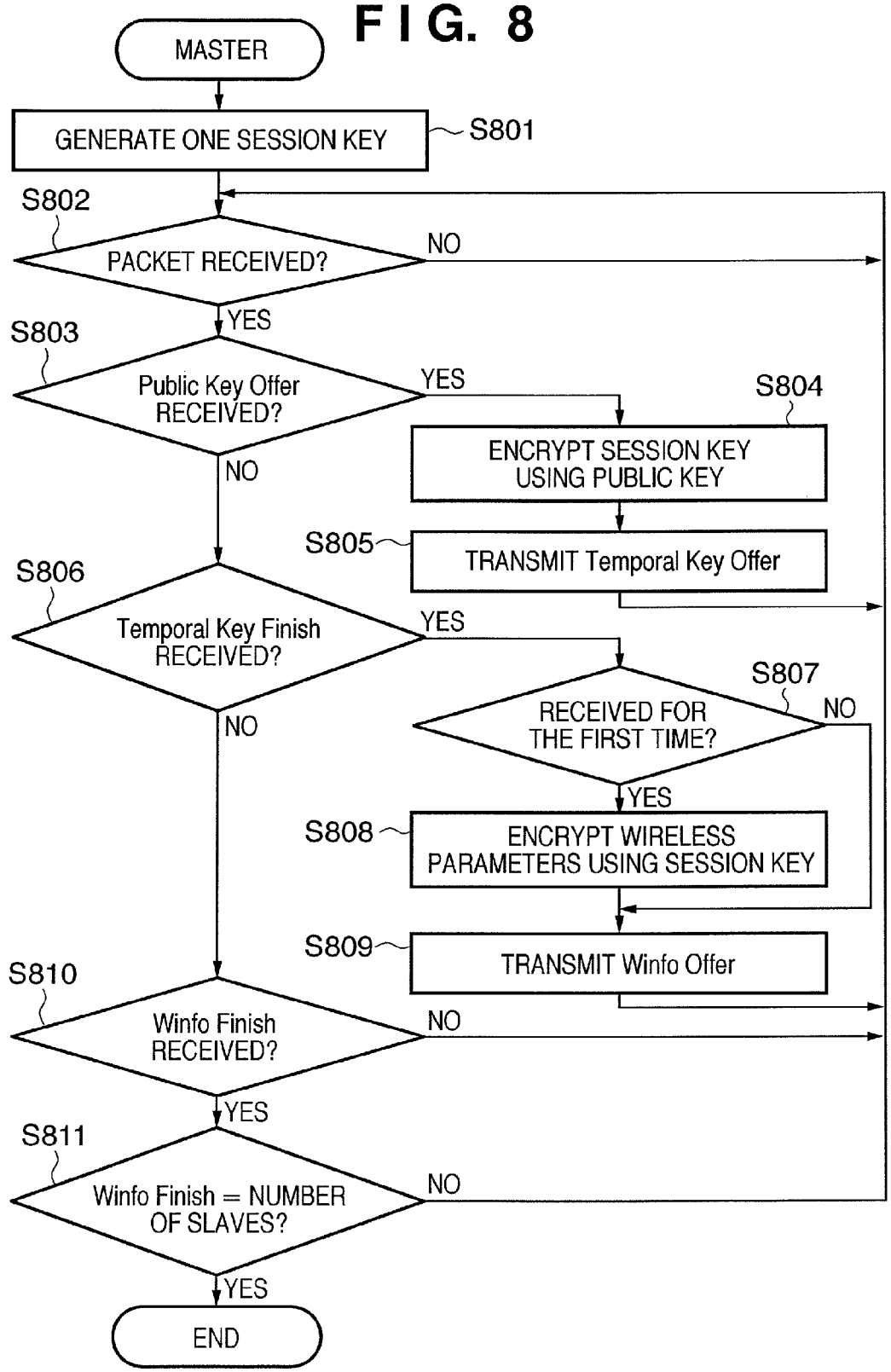
FIG. 8 is a flow chart illustrating master processing in Embodiment 2.

FIG. 7 is a diagram illustrating an automatic wireless communication parameter setting sequence used in the multiple device communication mode in Embodiment 2. FIG. 8 is a flow chart illustrating master processing in Embodiment 2. It should be noted that slave processing in Embodiment 2 is the same as in Embodiment 1 explained in FIG. 6.

First of all, the master 301 generates only one session key (S701, S801) and remains in stand-by condition until an arbitrary packet is received (S802).

Here, in the same manner as in Embodiment 1, the slave 302 encloses its public key in a "Public Key Offer" packet (S702) and transmits it to the master 301 by unicast. Subsequently, the slave 302 receives a "Temporal Key Offer" from the master 301 (S703) and decrypts the encrypted session key using its private key (S704). When the decryption is complete, it transmits a "Temporal Key Finish" (S708) to the master 301 by unicast. In addition, processing by the slave 303 is identical to Embodiment 1.

On the other hand, when the master 301 receives a packet ("YES" in S802), it determines whether the packet is a "Public Key Offer" (S803). Here, in case of a "Public Key Offer" from the slave 302 ("YES" in S803), a public key is retrieved from the packet and a session key is encrypted using the public key (S804). The master 301 encloses the encrypted session key in a "Temporal Key Offer" (S703) and transmits it to the slave 302 by unicast (S805). Operation is then halted until an arbitrary packet is received (S802).

Next, when the master 301 receives a "Temporal Key Finish" from the slave ("YES" in S806), it is determined whether it is received for the first time (S807). Here, if it is received for the first time, wireless communication parameters are encrypted using the session key and the encrypted session key is cached in the memory of the master 301 (S808). Subsequently, when the encryption is complete, the encrypted wireless communication parameters are enclosed in a "Winfo Offer" and transmitted to the slave that sent the "Temporal Key Finish" by unicast (S809). In this example, a "Temporal Key Finish" is received from the slave 302 (S708) and a "Winfo Offer" (S709) is transmitted.

In addition, if it is not the first reception, the cached encrypted wireless communication parameters are enclosed in a "Winfo Offer" and transmitted to the slave that sent the "Temporal Key Finish". Here, a "Temporal Key Finish" is received from the slave 303 (S711) and a "Winfo Offer" (S712) is transmitted.

It should be noted that processing performed by the slave that receives the "Winfo Offer" from the master 301 is identical to that of Embodiment 1.

Processing performed ("YES" in S810, S811) subsequently when the master 301 receives a "Winfo Finish" from the slaves (S710 or S713) is identical to that of Embodiment 1.

In this manner, the use of a single session key enables prevention of excessive consumption of memory area by session keys in built-in devices with low-capacity memory units and will make it possible to cope with redundant key lengths in the future.

[Variations]

Although in Embodiments 1 and 2 the master 301 transmits "Winfo Offers" to the slaves 302 and 303 individually using unicast, they can be transmitted by multicast as well. Doing so makes it possible to save wireless bandwidth.

Figure 9:
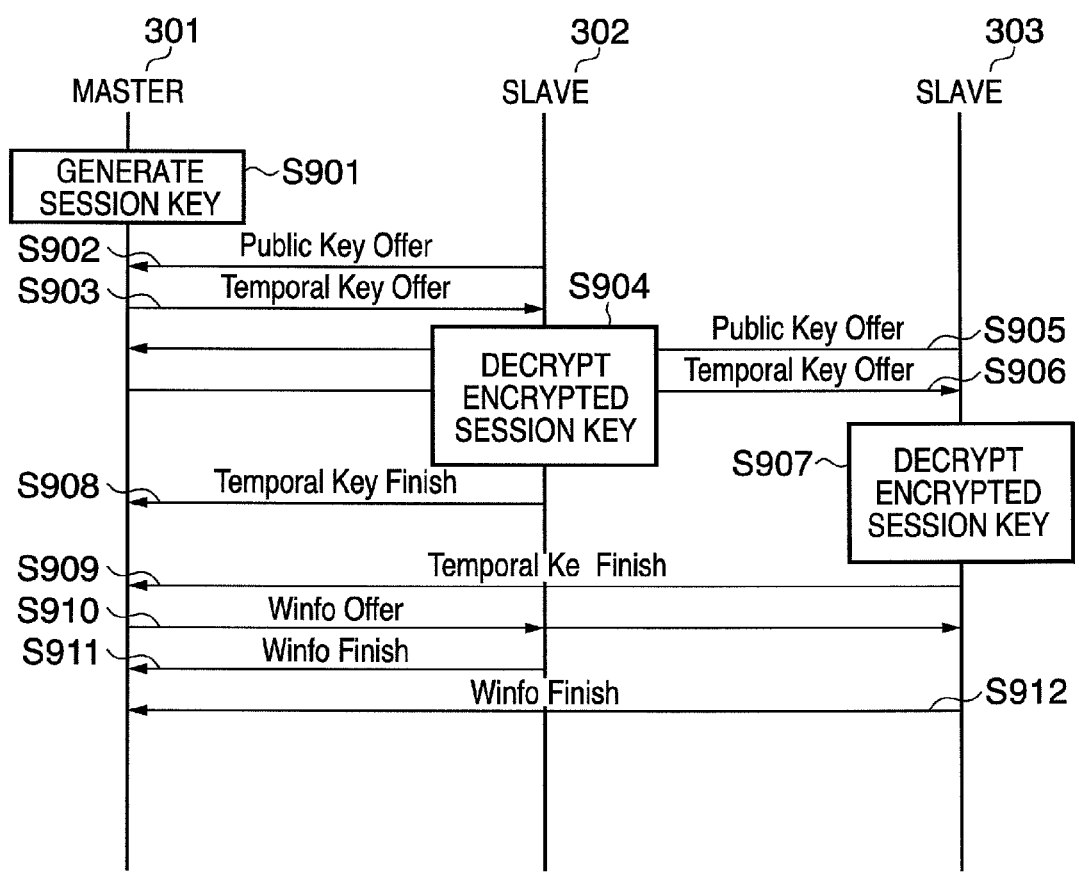
FIG. 9 is a diagram illustrating an automatic wireless communication parameter setting sequence used in the multiple device communication mode in a variation of Embodiment 2.
Figure 10:
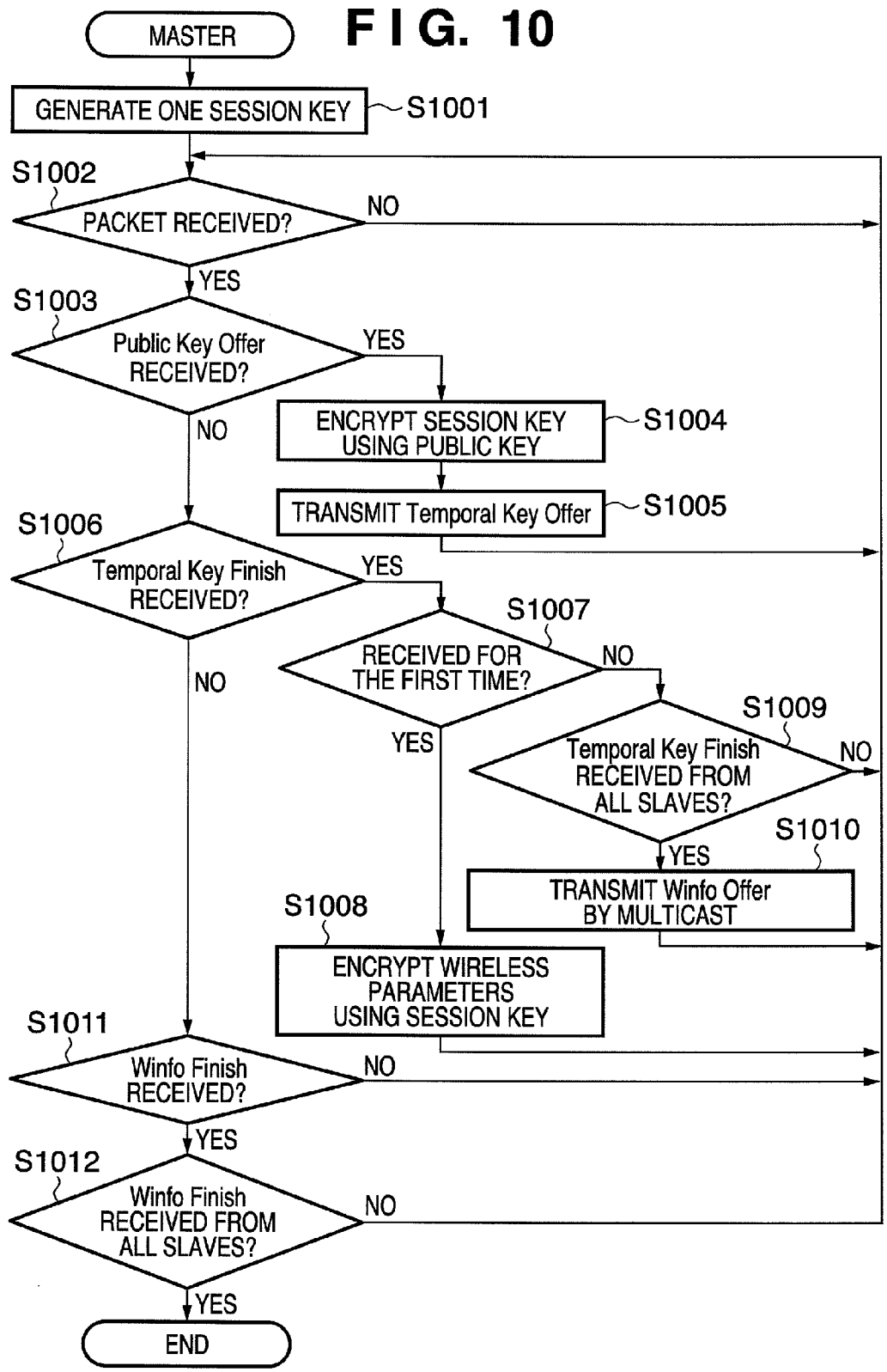
FIG. 10 is a flow chart illustrating master processing in a variation of Embodiment 2.

Here, a variation involving transmission of "Winfo Offers" by multicast is explained using FIG. 9 and FIG. 10.

FIG. 9 is a diagram illustrating an automatic wireless communication parameter setting sequence used in the multiple device communication mode in a variation of Embodiment 2. FIG. 10 is a flow chart illustrating master processing in a variation of Embodiment 2. It should be noted that because it is basically identical to Embodiment 2, explanations below focus on its differences from Embodiment 2.

During processing by the master 301, when a "Temporal Key Finish" is received from the slave for the first time ("YES" in S1007), wireless communication parameters are encrypted using the session key (S1008). After that, it is determined whether a "Temporal Key Finish" has been received from all the slaves (S1009). This determination is made, for instance, by providing a counter and counting the number of times it is received from the slaves. Then, if it has been received from all the slaves, a "Winfo Offer" (S910) is transmitted by multicast (S1010).

[Embodiment 3]

Next, a third embodiment of the present invention will be explained in detail by referring to drawings. In Embodiment 3, explanations are provided regarding a case, in which the slaves include those which only support conventional wireless communication parameter exchange methods.

It should be noted that the system configuration used for setting wireless communication parameters is the same as in Embodiment 1 illustrated in FIG. 3. Here, the master 301 detects the number of slaves 302 (e.g., L slaves) capable of using the above-described method of setting wireless communication parameters and the number of slaves 303 (e.g., M slaves) capable of using only conventional methods of exchanging wireless communication parameters.

Figure 11:
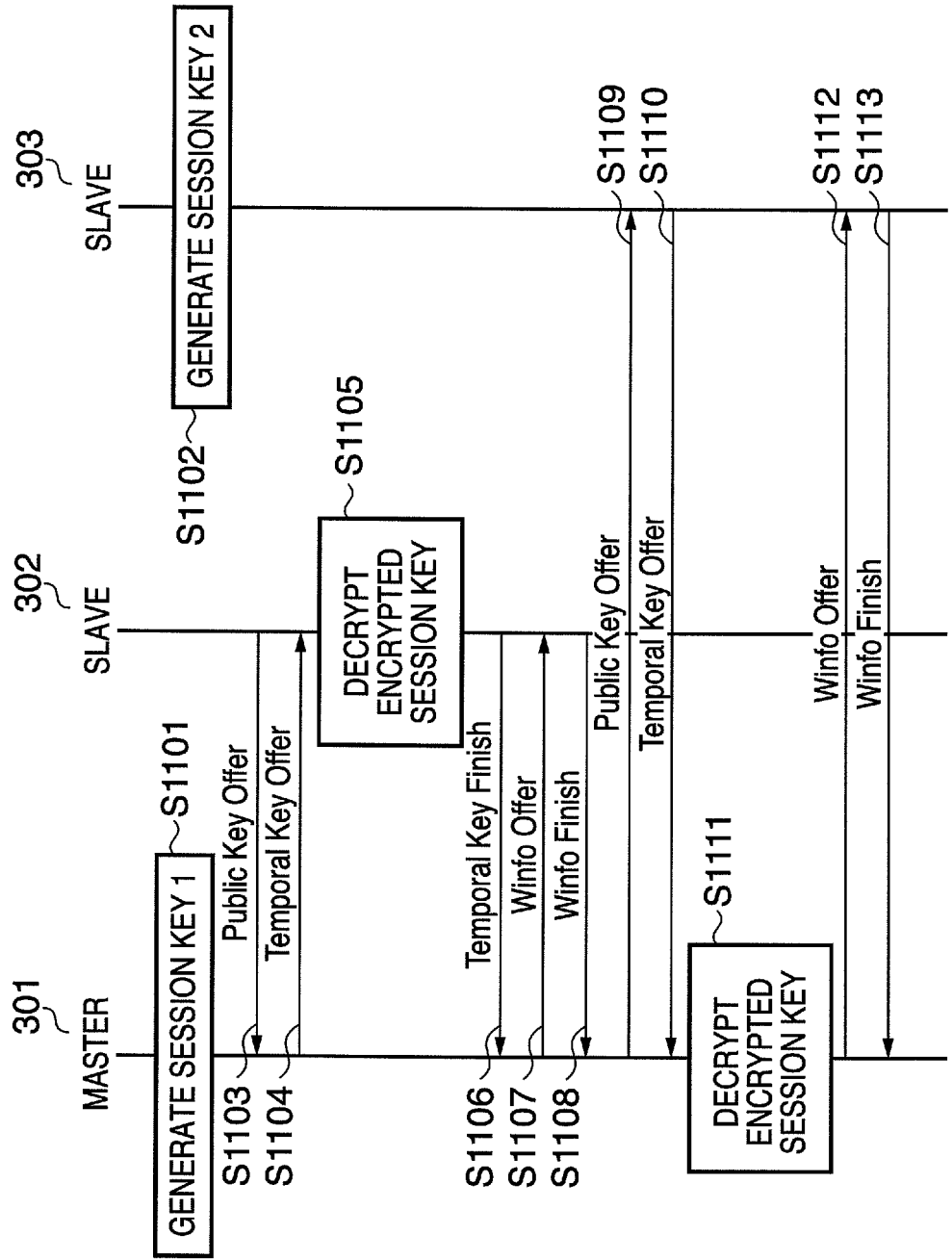
FIG. 11 is a diagram illustrating an automatic wireless communication parameter setting sequence used in the multiple device communication mode in Embodiment 3.
Figure 12:
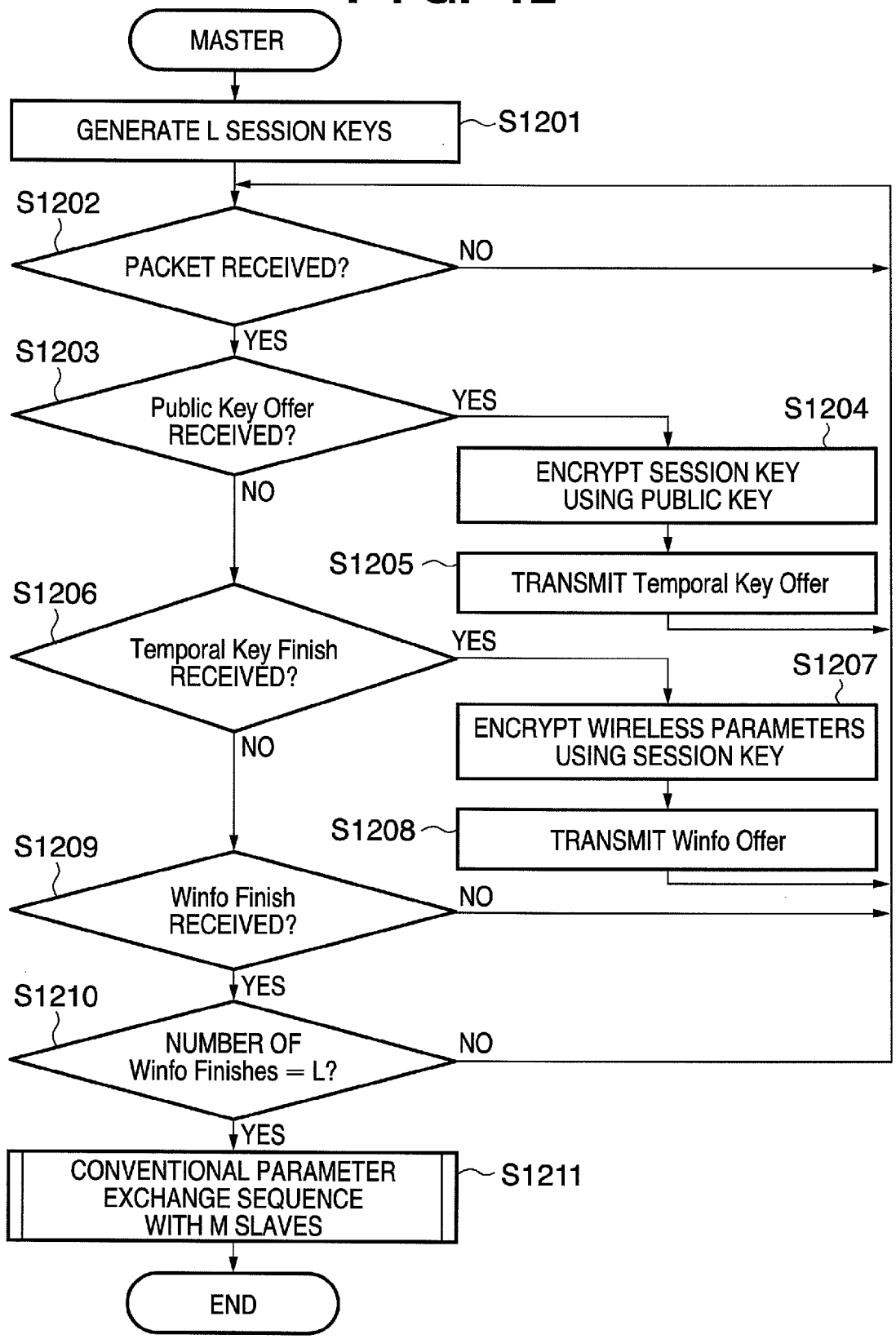
FIG. 12 is a flow chart illustrating master processing in Embodiment 3.
Figure 13:
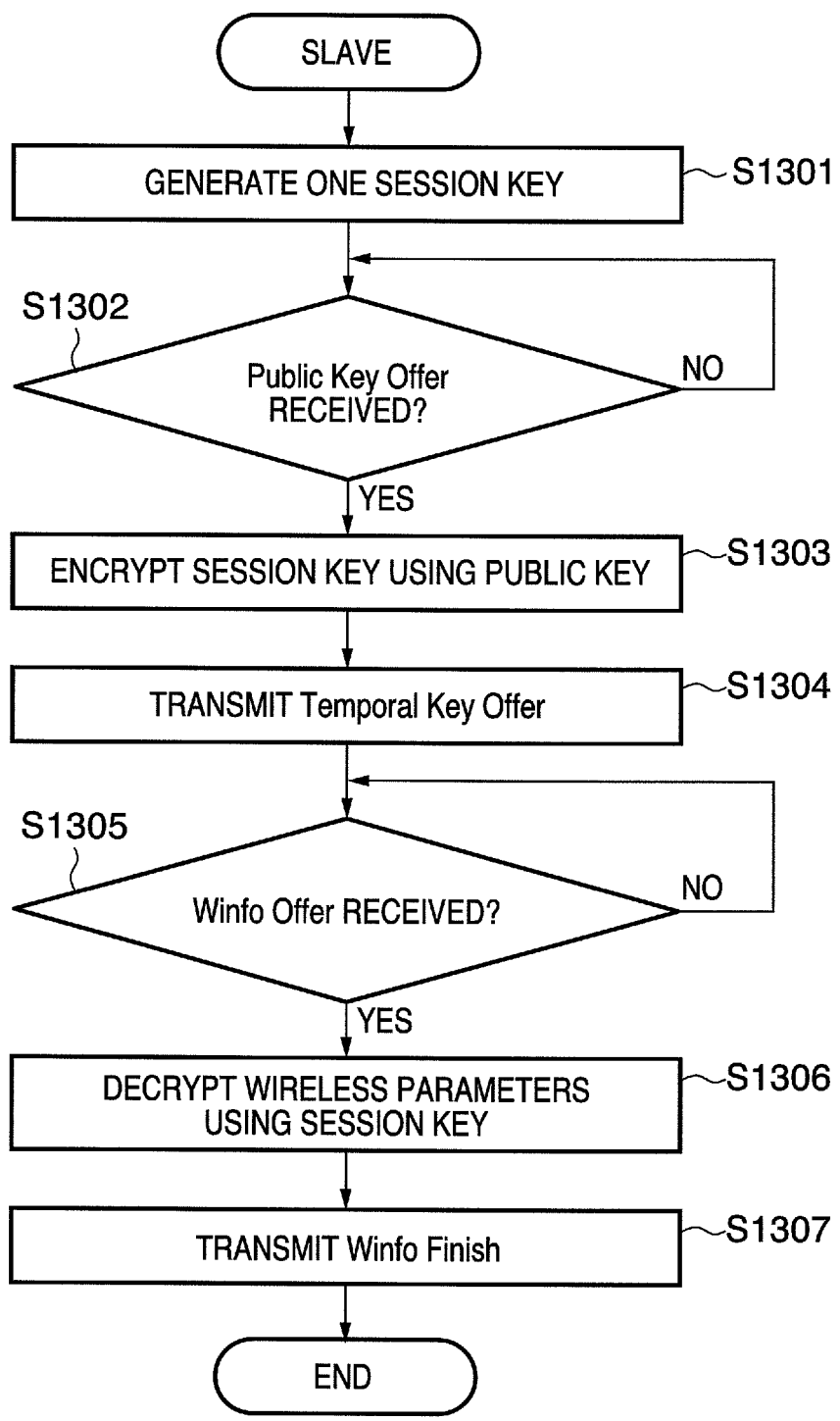
FIG. 13 is a flow chart illustrating slave processing supporting only conventional wireless communication parameter exchange methods.

FIG. 11 is a diagram illustrating an automatic wireless communication parameter setting sequence used in the multiple device communication mode in Embodiment 3. FIG. 12 is a flow chart illustrating master processing in Embodiment 3. FIG. 13 is a flow chart illustrating slave processing supporting only conventional wireless communication parameter exchange methods.

It should be noted that the sequence used between the master 301 and slaves 302, which are capable of using the above-described method of setting wireless communication parameters, is identical to Embodiment 1.

First of all, the master 301 generates L session keys (S1101, S1201) and remains in stand-by condition until an arbitrary packet is received (S1202). S1203 to S1209 are identical to the processing of the master 301 in S503 to S509 of Embodiment 1 and S1103 to S1108 of the sequence correspond to S403 to S405 and S409 to S411 illustrated in FIG. 4.

When the master 301 receives a "Winfo Finish" (S1108) ("YES" in S1209), it is determined whether it has been received L times (S1210). Here, if the result is YES, wireless communication parameters are exchanged with M slaves 303 using conventional methods (S1211).

First of all, the slave 303 generates a single session key (S1102, S1301) and receives a "Public Key Offer" (S1109) from the master 301 (S1302). Next, the public key of the master 301 is retrieved from the received packet and the session key is encrypted using the public key (S1303). The encrypted session key is then enclosed in a "Temporal Key Offer" (S1110) and transmitted to the master 301 by unicast (S1304).

Next, when the slave 303 receives a "Winfo Offer" (S1112) ("YES" in S1305), it retrieves the wireless communication parameters encrypted using the session key and performs decryption using the session key (S1306). Then, when the decryption is complete, it transmits a "Winfo Finish" (S1113) to the master 301 (S1307).

Embodiment 3 makes it possible to set wireless communication parameters for all devices together even if there are devices that do not support the method of setting wireless communication parameters explained in Embodiments 1 and 2.

Because in the above-described embodiments heavy-load processing involving the decryption of wireless parameters encrypted using public keys during wireless parameter setting by a plurality of wireless devices is performed by slaves, the master can perform wireless parameter setting with a plurality of slaves in parallel. As a result, the time it takes to complete wireless parameters setting for all the slaves can be shortened.

It should be noted that the present invention can be applied to a system composed of a plurality of devices (e.g. a host computer, interface devices, readers, printers, etc.) and to a system made up of a single device (e.g. a copy machine, a fax, etc.).

In addition, recordable media used to store the program code of the software implementing the functionality of the embodiments described above are provided to a system or device and the computer of the system or device (CPU or MPU) reads and executes the program code stored on the recordable media. Needless to say, this accomplishes the object of the present invention as well.

In such a case, the program code read from the recordable media implements the functionality of the above-described embodiments and therefore the recordable media, on which the program code is stored, form part of the present invention.

The recordable media used to supply the program code may include, for example, flexible disks, hard disks, optical disks, magneto-optical disks, CD-ROMs, CD-Rs, magnetic tape, nonvolatile memory cards, ROM, etc.

Moreover, needless to say, the implementation of the functionality of the above-described embodiments is based not only on the execution of the program code read by a computer and may also include the following cases. Namely, the functionality of the above-described embodiments is implemented if an OS (operating system) etc. running on a computer partially or entirely carries out actual processing based on the instructions of the program code.

Furthermore, needless to say, the invention also includes the following case. The program code read from the recordable media is written to memory provided in expansion boards inserted in the computer or expansion units connected to the computer. Thereafter, a CPU, etc. provided in the expansion boards or expansion units partially or entirely executes actual processing based on the instructions of the program code, and the functionality of the above-described embodiments is implemented based on such processing.

The present invention can carry out communication parameter exchange between a plurality of devices at high speed and can shorten the time required for constructing a network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-077400, filed Mar. 20, 2006, which is hereby incorporated by reference herein in its entirety.

The invention claimed is:

1. A communication system including a master device and a plurality of slave devices, wherein
the master device comprises:
a generation unit that generates a session key;
a unit that receives public keys from the plurality of slave devices, encrypts the session key using the public key of each slave device and transmits the encrypted session keys to the plurality of slave devices;
a first reception unit that receives decryption completion notifications, for notifying completion of decryption of the encrypted session key by the slave device, from the plurality of slave devices;
a communication parameters transmission unit that encrypts communication parameters using the session key and transmits the encrypted communication parameters to the plurality of slave devices, based on the reception of the decryption completion notifications by the first reception unit;
a second reception unit that receives acquirement notifications, for notifying acquisition of the communication parameters by the slave device, from the plurality of slave devices; and
a switching unit that switches to setting the communication parameters after the acquirement notifications have been received from all of the plurality of slave devices by the second reception unit, and
each slave device comprises:
a decryption unit that transmits the public key to the master device, receives the session key encrypted using the public key, and decrypts the session key;
a notification unit that transmits the decryption completion notification to the master device in a case where decryption of the session key is completed by the decryption unit;
a communication parameters decryption unit that receives the communication parameters encrypted using the session key from the master device and decrypts the communication parameters using the decrypted session key; and a second notification unit that transmits the acquirement notification to the master device in a case where the decryption of the communication parameters completes.

2. The communication system according to claim 1, wherein said generation unit generates respective different session keys for each slave device.

3. The communication system according to claim 1, wherein said generation unit generates a common session key for all the slave devices.

4. The communication system according to claim 3, wherein the communication parameters transmission unit broadcasts the encrypted communication parameters to the plurality of slave devices.

5. The communication system according to claim 4, wherein the communication parameters transmission unit broadcasts the encrypted communication parameters to the plurality of slave devices.

6. The communication system according to claim 1, wherein the communication parameters transmission unit transmits the encrypted communication parameters to the plurality of slave devices based on the reception of decryption completion notifications from all of the plurality of slave devices.

7. The communication system according to claim 1, wherein said master device uses said generation unit to generate a session key for the slaves in accordance with the functionality of the slaves.

8. The communication system according to claim 1, wherein said slave devices decrypt, using respective private keys, the encrypted session key received from said master device, which is encrypted using the respective public keys.

9. A communication device supplying communication parameters to a plurality of devices, comprising:
    a generation unit that generates a session key;
    a first reception unit that receives public keys from the plurality of devices;
    a first encryption unit that encrypts the session key using the respective public keys corresponding to the respective devices, received by the first reception unit;
    a first transmission unit that transmits to the plurality of devices the encrypted session keys encrypted by the first encryption unit;
    a second reception unit that receives, from the plurality of devices, decryption completion notifications for notifying completion of decryption of the respective encrypted session key transmitted by the first transmission unit;
    a second encryption unit that encrypts the communication parameters using the session key, based on the reception of the decryption completion notification by the second reception unit;
    a second transmission unit that transmits to the plurality of devices the encrypted communication parameters encrypted by the second encryption unit;
    a third reception unit that receives acquirement notifications for notifying acquisition of the communication parameters from the plurality of devices; and
    a switching unit that switches to setting the communication parameters after the acquirement notifications have been received from all of the plurality of devices by the third reception unit.

10. The communication device according to claim 9, wherein said generation unit generates respective different session keys for each slave device.

11. The communication device according to claim 9, wherein said generation unit generates a common session key for all the slave devices.

12. The communication device according to claim 11, wherein the communication parameters transmission unit broadcasts the encrypted communication parameters to the plurality of slave devices.

13. The communication device according to claim 12, wherein the communication parameters transmission unit broadcasts the encrypted communication parameters to the plurality of slave devices.

14. The communication device according to claim 9, wherein the communication parameters transmission unit transmits the encrypted communication parameters to the plurality of slave devices based on the reception of decryption completion notifications from all of the plurality of slave devices.

15. The communication device according to claim 9, wherein said master device uses said generation unit to generate a session key for the slaves in accordance with the functionality of the slaves.

16. A processing method for a communication system including a master device and a plurality of slave devices, comprising:
    a generation step, wherein the master device generates a session key;
    a public key transmission step, wherein each slave device transmits a public key to the master device;
    a public key reception step, wherein the master device receives the public keys from the plurality of slave devices;
    a session key transmission step, wherein the master device encrypts the session key using the public keys of each slave device and transmits the encrypted session key to the plurality of slave devices;
    a session key reception step, wherein each slave device receives the encrypted session key from the master device;
    a session key decryption step, wherein each slave device decrypts the encrypted session key;
    a notification step, wherein each slave device transmits a decryption completion notification to the master device when decryption of the session key is completed;
    a communication parameters transmission step, wherein the master device encrypts communication parameters using the session key and transmits the encrypted communication parameters to the plurality of slave devices, based on the reception of the decryption completion notification;
    a communication parameters reception step, wherein each slave device receives the encrypted communication parameters from the master device;
    a communication parameters decryption step, wherein each slave device decrypts the encrypted communication parameters using the decrypted session key;
    an acquirement notification transmission step, wherein each slave device transmits an acquirement notification to the master device in a case where the decryption of the communication parameters completes;
    an acquirement notification reception step, wherein the master device receives the acquirement notification for notifying acquisition of the communication parameters from each slave device; and
    a switching step, wherein the master device switches to setting the communication parameters after the acquirement notifications have been received from all of the plurality of slave devices.

17. A processing method for a communication device supplying communication parameters to a plurality of devices, comprising:
- a generation step of generating a session key;
- a first reception step of receiving public keys from the plurality of devices;
- a first encryption step of encrypting the session key using the respective public keys corresponding to the respective devices, received in the first reception step;
- a first transmission step of transmitting to the plurality of devices the encrypted session keys encrypted in the first encryption step;
- a second reception step of receiving, from the plurality of devices, notification of decryption completion of the encrypted session keys transmitted in the first transmission step;
- a second encryption step of encrypting the communication parameters using the session key, based on the reception of the notification in the second reception step;
- a second transmission step of transmitting to the plurality of devices the encrypted communication parameters encrypted in the second encryption step;
- a third reception step of receiving an acquirement notification for notifying acquisition of the communication parameters from the plurality of devices; and
- a switching step of switching to setting of the communication parameters after the acquirement notifications have been received from all of the plurality of devices in the third reception step.

* * * * *